United States Patent [19]
Fox

[11] Patent Number: 5,132,899
[45] Date of Patent: Jul. 21, 1992

[54] STOCK AND CASH PORTFOLIO DEVELOPMENT SYSTEM

[76] Inventor: Philip J. Fox, 116 Palm Ave., San Francisco, Calif. 94118

[21] Appl. No.: 421,652

[22] Filed: Oct. 16, 1989

[51] Int. Cl.[5] .............................................. G06G 7/52
[52] U.S. Cl. ..................................... 364/408; 364/401
[58] Field of Search ................ 364/408, 400, 401, 900

[56] References Cited

U.S. PATENT DOCUMENTS

| | | | |
|---|---|---|---|
| 4,334,270 | 6/1982 | Towers | 364/408 |
| 4,597,046 | 6/1986 | Musmanno et al. | 364/408 |
| 4,823,265 | 4/1989 | Nelson | 364/408 |

OTHER PUBLICATIONS

"Software Packages Assist Diverse Needs of Bond Portfolio Managers" Wall Street Computer Review Jun. 85 pp. 61–65.
"Insider Trading Databases" Satish Tyagi Wall Street Computer Review Jun. 85 pp. 53–56.
"Portfolio Management Systems" Steve Roberst Wallstreet Computer Review Mar. 89.
"The electric Wizard at Wall Street" Dec. 1984 Marketing Communications pp. 32–34.

Primary Examiner—Dale M. Shaw
Assistant Examiner—A. Bodendorf
Attorney, Agent, or Firm—Douglas E. White

[57] ABSTRACT

The present invention combines data gathering and processing methodology with computer apparatus to produce a system whereby a list of stocks and a cash position is generated and purchased for investment and operating accounts. Specifically, the system integrates three areas of data: investment performance for investment managers (the investment manager database); federal Securities Exchange Commission (SEC) reports filed quarterly by investment managers (the government report database); and financial characteristics for a large number of stocks (the stock database). Various screens and criteria are applied to the three data areas. The investment managers in the investment manager database are screened to find investment managers with top performances who meet a series of other criteria. The government reports are screened based upon the largest stock holdings for the investment managers chosen in the first step. The stock database financial characteristics are applied against the stocks from the government reports.

13 Claims, 5 Drawing Sheets

STOCK AND CASH PORTFOLIO DEVELOPMENT SYSTEM

FIELD OF THE INVENTION

This invention relates to financial business systems, more particularly, to data collection and processing methods and apparatus for generating a report containing a list of stocks and a cash position for purchase for investment and operating accounts.

BACKGROUND OF THE INVENTION

Since 1974, when the Employee Retirement Income Security Act (ERISA) was passed, there has been substantial growth in United States pension and profit sharing plans. ERISA mandates numerous rules which result in greater assets being held in trust for eventual retirees. Common law precedents also apply to taxable trust investment accounts.

All these trust assets cannot be accessed by companies and public bodies. They are to be invested solely for the benefit of the participants. Various investment managers acting for the trust fund committees invest primarily in stocks, bonds, and cash.

Twenty years ago, trades by individual investors constituted approximately seventy percent of the trades on the New York Stock Exchange (NYSE). In 1989, trades by pension funds and mutual funds now constitute approximately seventy-five percent of all NYSE trades. Selecting the right stocks and bonds has become extremely important because of the need for retiree payments.

Trust committees meet frequently to review asset allocation and the performance of their investment managers. Numerous consulting firms have been formed to supply advice and to assist the committee decision-making. Due to the complexity of relevant investment information and the magnitude of sums involved, it is desired to development a system for automating, to the extent practicable, the conduct of this type decision-making.

Prior developments in this field may be generally illustrated by reference to the following patents:

| Patent No. | Patentee | Issue Date |
|---|---|---|
| 4,694,397 | Grant et al. | Sep. 15, 1987 |
| 4,674,044 | Kalmus et al. | Jun. 16, 1987 |
| 4,642,768 | Roberts | Feb. 10, 1987 |
| 4,346,442 | Musmanno | Aug. 24, 1982 |

There is no product similar to or the same as the method and apparatus of the present invention, which provides an investment management system that builds from the best performing investment managers.

A product known under the service mark ALPHA AMPLIFIER, available from John Hancock Company of Hartford, Conn., builds from the existing stocks held by pension plans and is not related to the present invention other than in the general goal of guiding investment decision-making.

SUMMARY OF THE INVENTION

The present invention combines data gathering and processing methodology with computer apparatus to produce a system whereby a list of stocks and a cash position is generated and purchased for investment and operating accounts.

Specifically, the system integrates three areas of data: investment performance for investment managers (investment manager database); federal Securities Exchange Commission (SEC) reports filed quarterly by investment managers (government port database); and financial characteristics for a large number of stocks (stock database).

Various screens and criteria are applied to the three data areas. The investment managers in the investment manager database are screened to find investment managers with top performances who meet a series of other criteria. The government reports are screened based upon the largest stock holdings for the investment managers chosen in the first step. The stock database financial characteristics are applied against the stocks from the government reports.

A consultant and a computer operator run the system, although these may perhaps be one and the same person. For clarity, the particular investment manager for whose benefit the system is being run by the consultant (i.e., who receives the system output and executes the buys and sales) shall hereinafter be termed the "portfolio manager" in order to distinguish him or her from the list of investment managers in the investment manager database.

The screening results in a list of stocks and a cash position which the portfolio manager can implement (i.e. purchase) for his or her clients. Some further tailoring may be done in actual practice, based on the client's objectives. For most clients, however, the process can be applied automatically, exactly as is. Special client objectives can be programmed into the computer system of the present invention on a custom basis.

FEATURES AND ADVANTAGES

An object of this invention is to provide a data processing system for producing, with a computer, a stock and cash portfolio report based upon the performance of major United States institutional investment managers and their stock and cash holdings. Accordingly the system disclosed herein includes means for entering and storing in the computer an investment manager database containing first data on the investment managers; means responsive to the first data for selectively generating a first investment manager subset of investment managers from the investment manager database based on predetermined criteria; and means responsive to the first data for selectively generating a second investment manager subset of investment managers from the first investment manager subset based on performance according to each investment manager's rate of return.

Another feature of the system is means for entering and storing in the computer a government reports database containing second data from reports filed with the government by each of the investment managers of the investment manager database; means responsive to the second data for selectively generating a list of stock holdings for each of the investment managers of the second investment manager subset, the contents of the stock holdings lists arranged top to bottom in descending order of market value; and means responsive to the second data for selectively generating a stock holdings subset of stock holdings based on selecting a predetermined number of investment managers'stocks taken sequentially from the top of the stock holdings list of each of the investment managers of the second investment manager subset.

Yet another feature is means for entering and storing in the computer a stock database containing third data relating to a plurality of financial characteristics for a plurality of traded stocks; means responsive to the third data for determining whether the average beta value of the stock holdings subset is greater than 1.0; and first means for updating the stock holdings subset, when the average beta value of the stock holdings subset is greater than 1.0, until the average beta value of the stock holdings subset is not greater than 1.0.

Another feature is means responsive to the third data for determining the average capitalization of the stock holdings subset and for comparing the average capitalization of the stock holdings subset with the average capitalization of the Standard and Poors 500 (S&P 500) or other standard stock list; and second means for updating the stock holdings subset, when the average capitalization of the stock holdings subset is less than the average capitalization of the S&P 500 stock list, until the average capitalization of the stock holdings subset is not less than the average capitalization of the S&P 500 stock list.

Still another feature is means responsive to the third data for sorting the stock holdings subset according to industry and for comparing the percentage representation of industries in the stock holdings subset with the percentage representation of industries on the S&P 500 stock list to determine if the percentages deviate beyond a predetermined limit; and third means for updating the stock holdings subset, when the percentages deviate beyond the preset limit, until the percentages do not deviate beyond the preset limit.

Another feature is means responsive to the first data for determining the average cash position of the investment managers of the second investment manager subset; and means for outputting the stock and cash portfolio report from the computer based on the stock holdings subset and the average cash position of the investment managers of the second investment manager subset.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 3, comprising FIGS. 3a, 3b, and 3c, is a schematic flow chart depicting the data processing methodology for applying the stock financial characteristics to the stocks selected and for screening the final stock list.

DESCRIPTION OF A PREFERRED EMBODIMENT

Figure 1:
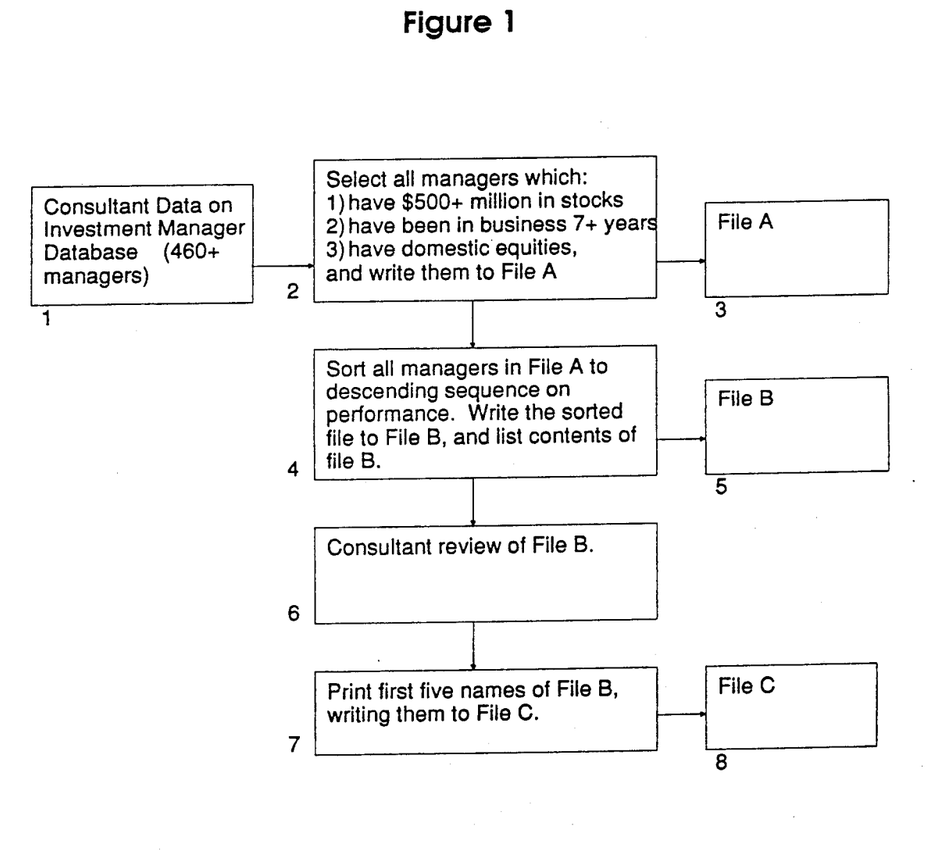
FIG. 1 is a schematic flow chart depicting the data processing methodology for selecting the top performing investment managers.
Figure 2:
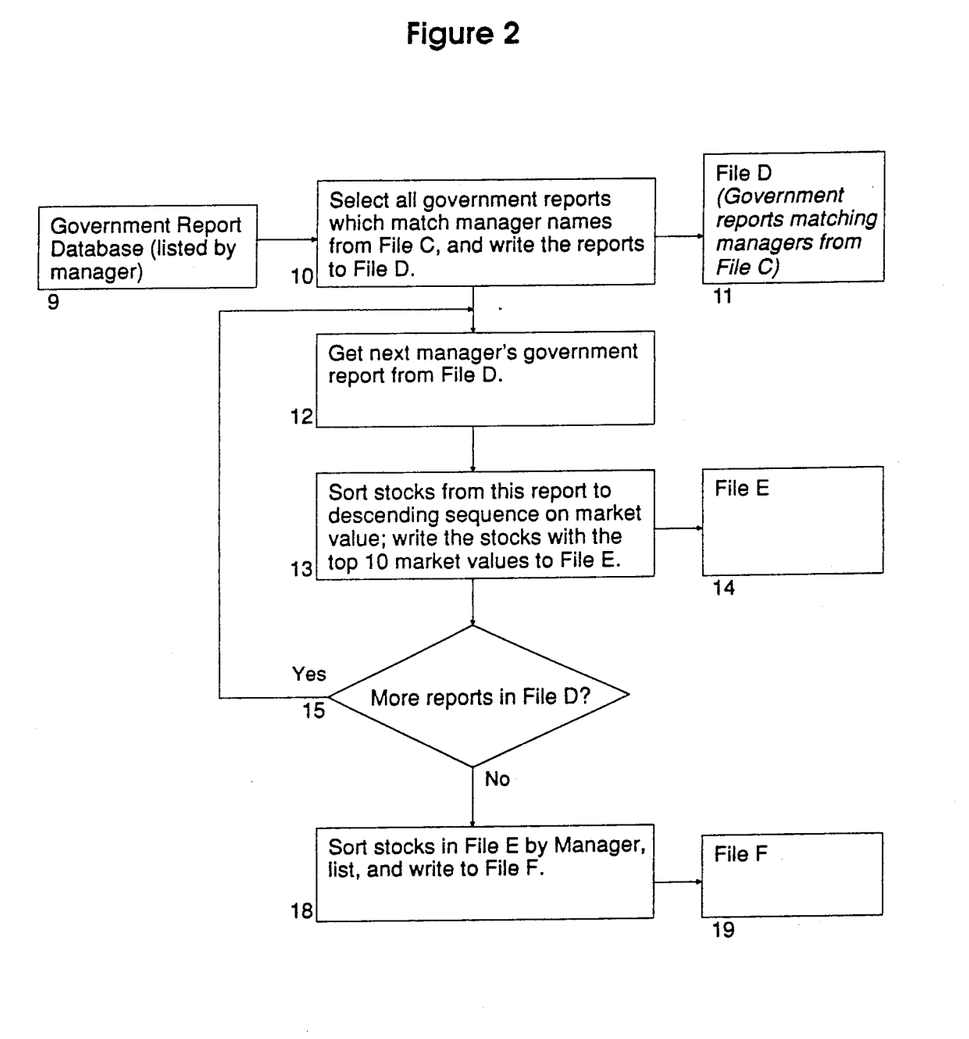
FIG. 2 is a schematic flow chart depicting the data processing methodology for screening the government reports to obtain the largest dollar holdings for the investment managers previously selected.

The stock and cash portfolio development system of the present invention is illustrated in FIGS. 1-3. It brings together and processes information from the investment manager database, the government report database, and the stock database.

FIG. 1 illustrates the computer manipulation of the investment manager database. This database may be obtained from a pension consulting firm such as Computer Direction Associates of Silver Spring, Md., and entered into a computer through such common means as magnetic media exchange or manual keyboard transcription. The investment managers from the investment manager database of box 1 are screened (box 2) for the following criteria: size of managed assets, years in business and investment style. "Investment style" is a description of the types of stocks a manager specializes in, such as domestic equities or international equities.

The purpose of this screening is to produce for further processing a first subset of investment managers from the investment manager database, according to objective criteria deemed to be desirable for investment purposes. In the embodiment presently preferred, the database may contain 460 or more manager names and it is desired to produce a stock holdings subset of their holdings comprising 50 or more stocks, as discussed below. As illustrative and preferred selection criteria, one may sort and retain all managers which: 1) have $500 million or more in stocks; 2) have been in business for 7 or more years; and 3) have domestic equities, and write them to a storage area designated File A (box 3). The invention, however, may be practiced on a wide variety of scales. Therefore, these numbers, as well as all other quantities listed in the drawing, are provided for purposes of illustration only and are not limiting.

The investment managers selected in box 2 and listed in box 3 are next sorted into descending order in order of performance and written to File B (box 5). The performance of each manager has been loaded into the computer based on the standard rate of return formula:

$$(ME - MB - CNET)/(MB + (CNET/2)) = R$$

where:
ME = Market Value, Ending of Period
MB = Market Value, Beginning of Period
CNET = Contributions − Distributions − Administrative Costs
R = Rate of Return Calculations are made monthly or quarterly and then linked (multiplied) together for longer periods. This is the generally accepted formula in the investment business and is based on the 1968 Banking Administration Institute Study.

At box 6, the system consultant or the computer operator (who may or may not be the same person) is given a chance to manually review the list of investment managers which were screened by criteria and stored in File A, then sorted by performance and stored in File B. The consultant may delete from or re-order the list of File B based upon factors outside the system involving the investment managers on the list, such as recent lawsuits, regulatory changes, personnel changes, or the like. This is an optional refinement which often is beneficial; however, the basic system can be run automatically in a computer without this step.

The second investment manager subset is selected (box 7) and written to File C (box 8). As noted, the consultant may have eliminated one or more managers in the previous step. The list remains in descending order of performance and the second subset is selected from the top of this list for File C. While five is the number of managers selected in the embodiment of the invention presently preferred and described, any reasonable number could be selected for further processing.

The sequence of steps detailed in FIG. 2 is used to produce an abbreviated list of stocks "owned" by these five managers of the second subset, which list is based, at least initially, on the top valued stocks of the second investment manager subset.

A 13F report is filed quarterly with the SEC by all investment managers with over $100 million in stocks. The 13F report is a listing of all stocks, with their dollar values, which the investment manager filing the report owns. FIG. 2 illustrates activities utilizing the SEC 13F government report database (box 9), which has been entered into the computer. This database contains one government report for each investment manager, listed by investment manager. Each chosen investment manager in File C, previously selected in box 7 of FIG. 1, is matched with his or her appropriate government report (box 10) and the results written to File D (box 11).

Boxes 12-15 represent a programming loop wherein each investment manager's government report from File D is operated on in sequence. The first or next report is selected from the matching government report file, File D in box 12. Next (box 13), the stocks listed in this government report (i.e. the stocks of one chosen manager) are sorted top to bottom according to descending market value. In the example shown, the ten largest stocks according to market value are selected and written to File E (box 14); however, any suitable number of stocks could be selected.

The test of box 15 checks to see if all the SEC 13F government reports of File D have had their stocks sorted and listed. If more reports remain to be processed, the program cycles back to box 12. If no reports remain to be processed, the program moves on to the test of box 16.

50 stocks are sought in this example (10 stocks in File E for each of the 5 managers of File C). However, any number of stocks could be chosen, depending on the scope of the system selected. The program next moves ahead to box 18, wherein the 50 stocks are sorted by investment manager and written to File F.

FIG. 3 illustrates the integration of the stock database, containing financial characteristics including various financial ratios, for a large number of traded stocks (in this example, 2000 stocks), with the stocks chosen in File F from the high performance investment managers of File C. Several sources exist for the stock database. The presently preferred product is available under the name STOCKVAL from Gould Research of Phoenix, Ariz.

FIG. 3 includes a series of tests designed to produce, as explained in more detail hereinbelow, a portfolio of stocks (the stock holdings subset) which is no more volatile than the S&P 500 stocks, which has an average capitalization which is not less than the average capitalization of the S&P 500, and which does not represent industries to a greater or lesser extent than said industries are represented in the S&P 500 by more than a pre-determined percentage limit or allowable deviation. It also produces a cash position which is based on the average cash position of the five selected managers of the second investment manager subset.

Figure 3A:
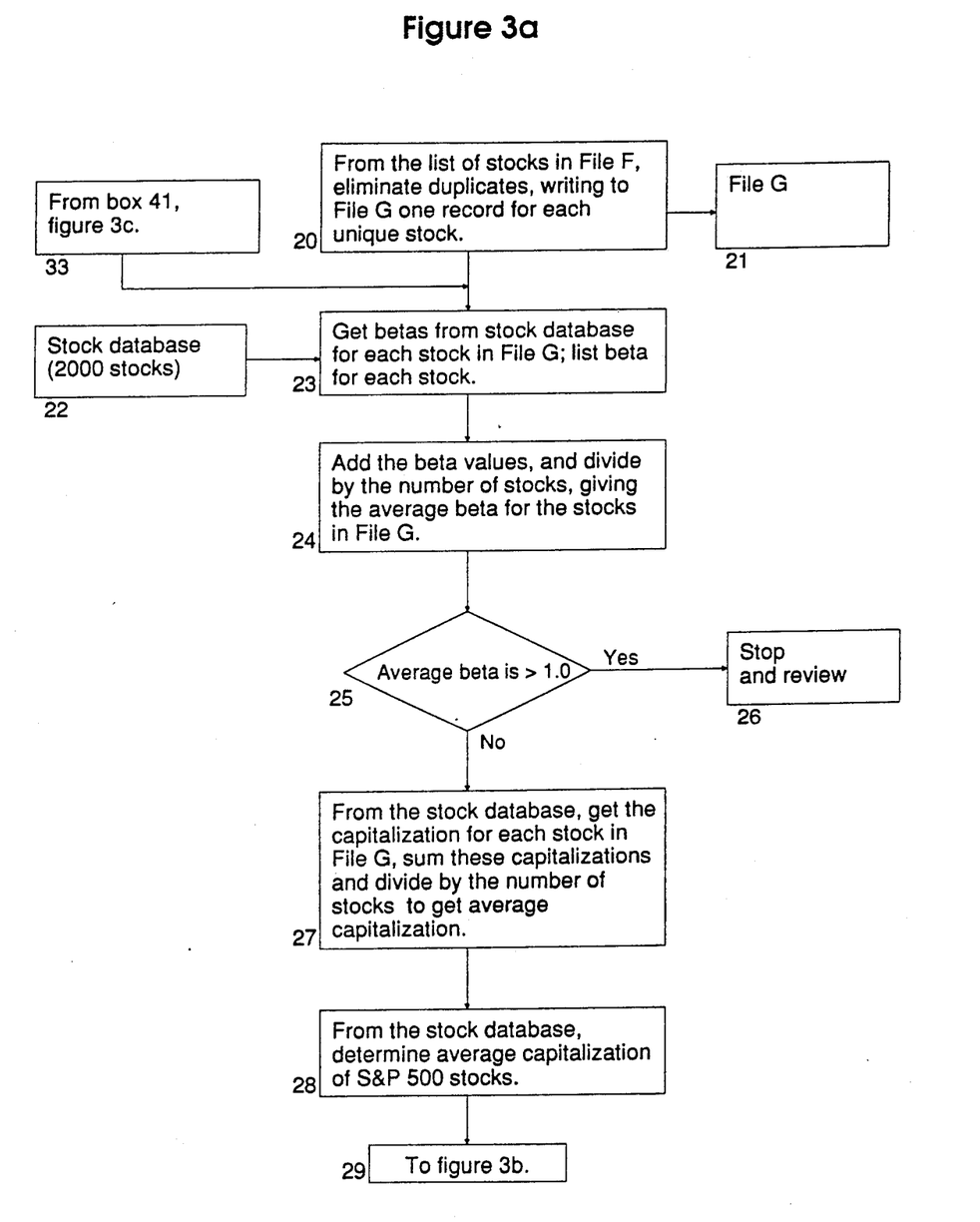

The compilation, entry, and storage in the computer of the stock database is represented in box 22 of FIG. 3a.

Box 20 represents a function in which duplicate stocks are eliminated. If a stock is duplicated, it is to be counted only once so that there will be one record for each unique stock. The stock list (or stock holdings subset) which does not contain duplicates is stored in File G (box 21).

Next, the average beta (volatility) of a stock portfolio in File G is checked (box 23). The stock database contains the beta of each individual stock represented in the database. The beta for each stock in File G is obtained in box 23 from box 22 and listed or stored for further processing. This list of beta values is summed and divided by the number of beta values (box 24) to obtain the average beta value for the portfolio of stocks in File G (the portfolio beta).

The test of box 25 determines whether the average or portfolio beta is greater than 1.0. If so, the operator or consultant may manually review the portfolio and add or substitute lower beta value stocks to File G to bring the average to 1.0 or less (box 26). This subjective judgmental step may easily be replaced with a computer subroutine (not illustrated) involving the addition or substitution of "next in line" stocks, essentially as follows. The next stock of the first manager in File E (starting in this example with number 11 on that manager's list) is added to File G if the stock's beta is less than 1.0. If not, the next stock on the second manager's list is tested for a beta lower than 1.0. If five tries fail to produce a stock with a beta less than 1.0, stock number 12 of the first manager's list is tested, and so on.

Alternatively, one may keep the list a constant size if the last stock (number 10) of the last (fifth) manager's list presently included in File G is first removed if its beta is greater than 1.0 and is then replaced by a stock with a beta of 1.0 or less from the first or succeeding manager's list, the deletion and replacement stocks being sequentially selected by the process of elimination previously described or one substantially equivalent thereto.

If (or once) the average beta is 1.0 or less (the overall market beta or volatility being 1.0, by definition), then the computer program resumes with the step of box 27.

Box 27 represents a check on the capitalization of the stocks in File G. Capitalization, as used herein, is the total number of outstanding shares for a stock times the current price of that stock. In box 27, the capitalization of each stock in File G is summed with the others and the total is divided by the number of stocks in File G to obtain the average or portfolio capitalization.

Using the stock database, the program next determines (box 28) the average capitalization of the S&P 500 stocks, all of which are contained in the stock database. Another standard list of stocks could be substituted for the S&P 500, even one independently developed by the system user. The average or portfolio capitalization of File G is then compared (box 31 of FIG. 3b) against the average capitalization of the S&P 500. If the portfolio capitalization is less than the S&P 500 capitalization, manual intervention by the consultant and/or the computer operator or, alternatively, a computer subroutine is used (box 32) to add higher capitalization stocks to the File G portfolio, in accordance with the process of elimination previously described with respect to the step of box 26.

Figure 3B:
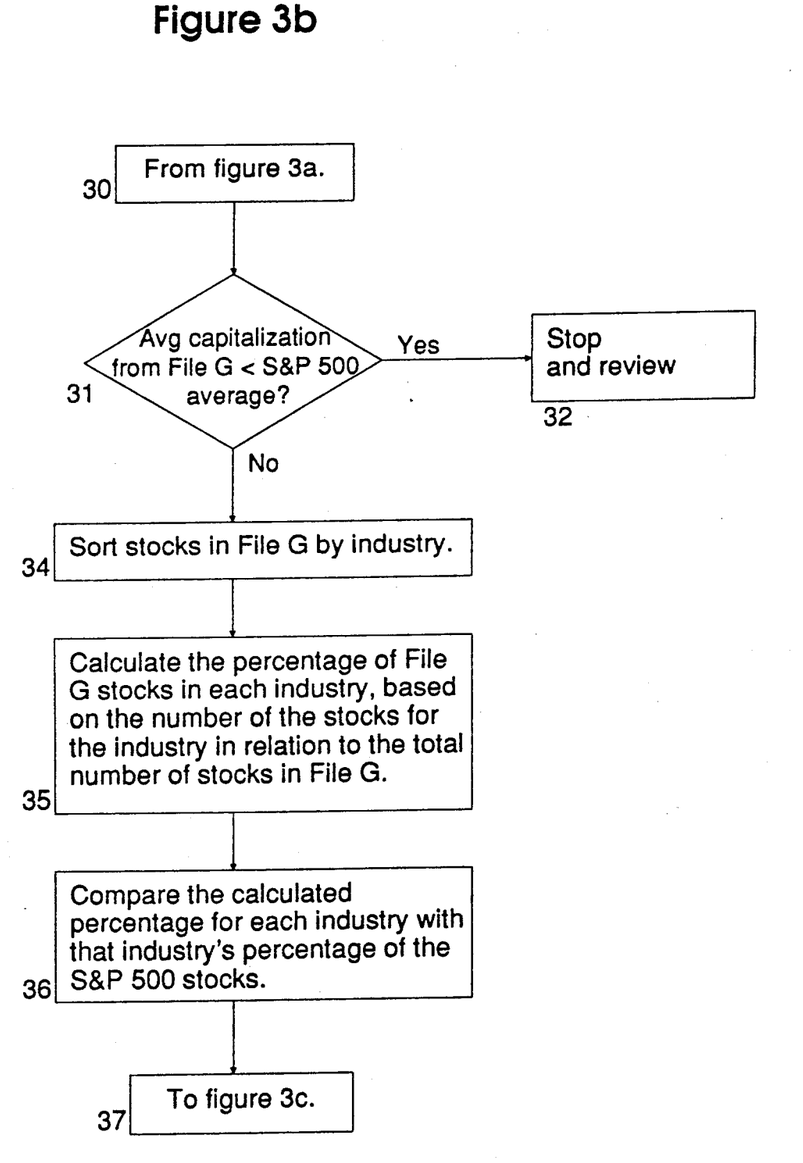

In the step of box 34, the stocks of File G are sorted by industry to prepare for an industry representation check in the step of box 35. An "industry" is a grouping of stocks with a common business, such as oil stocks or utility stocks. The percentage of stocks in the stock holdings subset of File G falling into each industry grouping is calculated. This percentage is the number of stocks in one industry in File G divided by the total number of stocks in File G and multiplied by 100.

The percentage in each industry in File G is now compared (box 36) with that industry's percentage in the S&P 500 stock list, the latter percentage being obtained from the stock database of box 22 of FIG. 3a. This is a check to determine if any industry is over or under represented in File G. In test 40 of FIG. 3c, a predetermined limit is used for the normalization of over or under represented industries in File G, which limit in this example is a deviation of plus or minus 15 percentage points. However, many reasonable limits could be used at this juncture, depending on how important the consultant feels it is to eliminate deviation in the portfolio from this S&P 500 average.

Figure 3C:
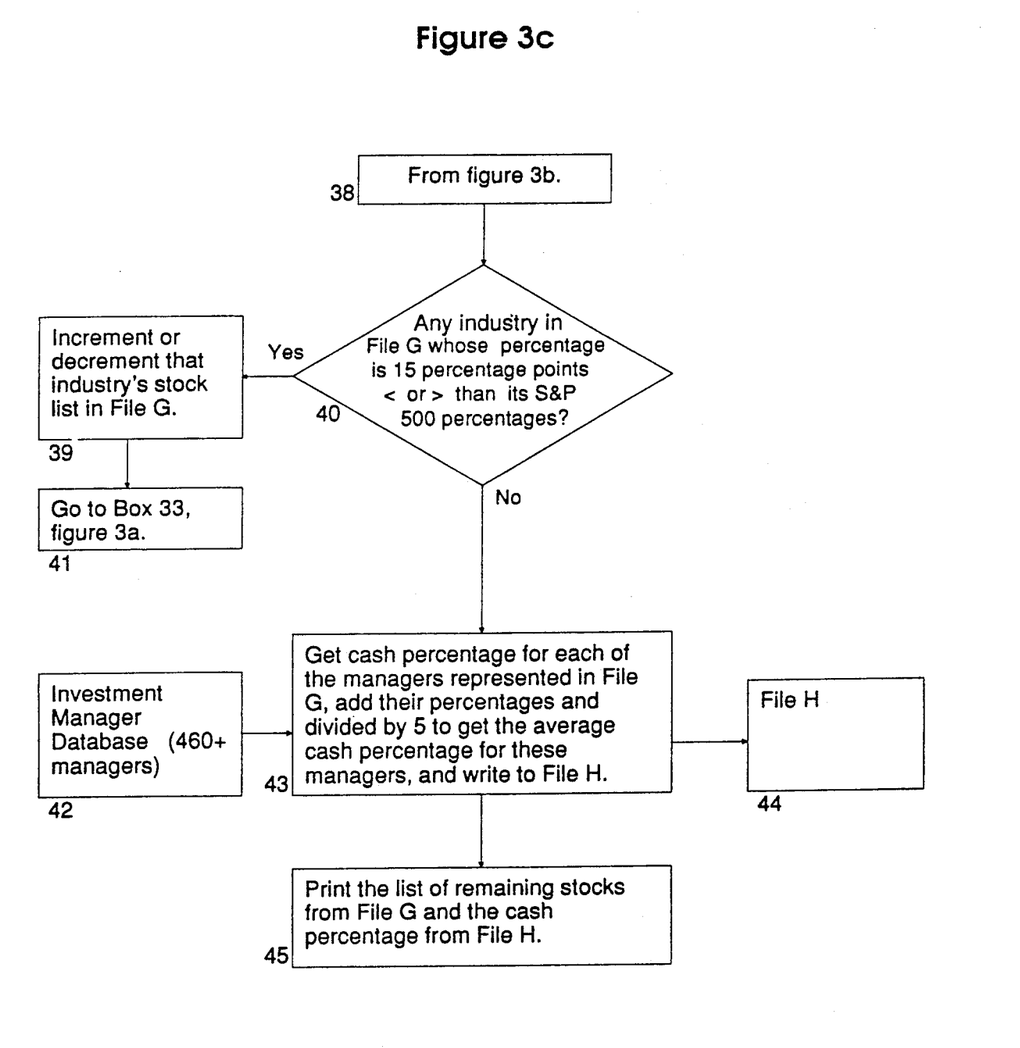

Industries in File G outside the limit have their stock compositions augmented or decremented, depending on whether they are under or over represented, respectively (box 39). Augmentation can be done by a subroutine (not illustrated) which takes the next stock of the first manager in File E (e.g. number 11 on that manager's list) and adds it to File G if it is in the under represented industry. If not, the next stock of the second manager is tested by industry, and so on. If five tries do not produce a stock from the desired industry, the computer returns to the first manager's list (number 12) and the process is repeated.

Decrementation may proceed in the reverse manner. For example, the last stock (normally number 10) on the last manager's list is removed if it is in the over represented industry. If not, the last stock on the fourth manager's list is tested, and so on.

The program recycles from box 39 to box 23 of FIG. 3a to recheck the stocks remaining in File G by industry grouping against the 15 percentage point limit and to re-run the beta and capitalization tests on the reconstituted File G. Similar loops may occur as a result of the tests represented in boxes 25 and 31, but have been left out of the drawing for clarity and simplicity in illustration.

Once no industries are outside the limit, the program continues at box 43 to determine the cash percentage in the final portfolio. The exact data from the investment manager database described in box 1 of FIG. 1 is accessed at this point, which is repeated at this point as box 42 for clarity. From the investment manager database of box 42, the average cash position, expressed as a percentage, is obtained for the five managers in the second investment manager subset of File C by summing the cash percentage for all five and dividing by five. This average cash position is listed in File H (box 44).

Files G and H now contain the final portfolio, which is outputed in print and/or on screen (box 45). It is from this final portfolio report that the portfolio manager makes the actual buys, sales, and cash position adjustments through cash flow, cash flow being defined as the cash needed to be used for stock purchases or the cash resulting from stock sales.

While the above provides a full and complete disclosure of the preferred embodiments of this invention, various modifications, alternate constructions, and equivalents may be employed without departing from the true spirit and scope of the invention. Such changes might involve alternate databases, processes, criteria, structural arrangements, capacities, sizes, operational features, reports or the like. Therefore, the above description and illustrations should not be construed as limiting the scope of the invention which is defined by the appended claims.

I claim:

1. A data processing system for producing with a computer a stock and cash portfolio report based upon the performance of major United States institutional investment managers and their stock and cash holdings including:
   first data means for entering and storing in the computer an investment manager database containing first data on the investment managers;
   first manager subset means responsive to the first data for selectively generating a first investment manager subset of investment managers from the investment manager data based on predetermined criteria; and
   second manager subset means responsive to the first data for selectively generating a second investment manager subset of investment managers from the first investment manager subset based on performance according to each investment manager's rate of return.

2. The system of claim 1 wherein:
   the predetermined criteria include size of managed assets, years in business, and investment style of the investment managers.

3. The system of claim 1 further including:
   second data means for entering and storing in the computer a government reports database containing second data from reports filed with the government by each of the investment managers of the investment manager database;
   list means responsive to the second data for selectively generating a list of stock holdings for each of the investment managers of the second investment manager subset, the contents of the stock holdings lists arranged top to bottom in descending order of market value; and
   stock holdings subset means responsive to the second data for selectively generating a stock holdings subset of stock holdings based on selecting a predetermined number of investment manager's stocks taken sequentially from the top of the stock holdings list of each of the investment managers of the second investment manager subset.

4. The system of claim 3, further including:
   third data means for entering and storing in the computer a stock database containing third data relating to a plurality of financial characteristics for a plurality of traded stocks;
   beta means responsive to the third data for determining whether the average beta value of the stock holdings subset is greater than a predetermined beta value; and
   first updating means for updating the stock holdings subset, when the average beta value of the stock holdings subset is greater than the predetermined beta value, until the average beta value of the stock holdings subset is not greater than the predetermined beta value.

5. The system of claim 3, further including:
   third data means for entering and storing in the computer a stock database containing third data relating to a plurality of financial characteristics for a plurality of traded stocks;

standard capitalization means responsive to the third data for determining the average capitalization of a standard stock list of the stock database;

subset capitalization means responsive to the third data for determining the average capitalization of the stock holdings subset and for comparing the average capitalization of the stock holdings subset with the average capitalization of the standard stock list; and second updating means for updating the stock holdings subset, when the average capitalization of the stock holdings subset is less than the average capitalization of the standard stock list, until the average capitalization of the stock holdings subset is not less than the average capitalization of the standard stock list.

6. The system of claim 3, further including:

third data means for entering and storing in the computer a stock database containing third data relating to a plurality of financial characteristics for a plurality of traded stocks;

standard industry means responsive to the third data for sorting the stock database according to industry and for determining the percentage representation of industries on a standard stock list of the stock database;

subset industry means responsive to the third data for sorting the stock holdings subset according to industry and for comparing the percentage representation of industries in the stock holdings subset with the percentage representation of industries on the standard stock list to determine if the percentages deviate beyond a predetermined limit; and third updating means for updating the stock holdings subset, when the percentages deviate beyond the preset limit, until the percentages do not deviate beyond the preset limit.

7. The system of claim 4, further including:

third data means for entering and storing in the computer a stock database containing third data relating to a plurality of financial characteristics for a plurality of traded stocks;

standard capitalization means responsive to the third data for determining the average capitalization of a standard stock list of the stock database;

subset capitalization means responsive to the third data for determining the average capitalization of the stock holdings subset and for comparing the average capitalization of the stock holdings subset with the average capitalization of the standard stock list; and second updating means for updating the stock holdings subset, when the average capitalization of the stock holdings subset is less than the average capitalization of the standard stock list, until the average capitalization of the stock holdings subset is not less than the average capitalization of the standard stock list.

8. The system of claim 7, further including:

third data means for entering and storing in the computer a stock database containing third data relating to a plurality of financial characteristics for a plurality of traded stocks;

standard industry means responsive to the third data for sorting the stock database according to industry and for determining the percentage representation of industries on the standard stock list;

subset industry means responsive to the third data for sorting the stock holdings subset according to industry and for comparing the percentage representation of industries in the stock holdings subset with the percentage representation of industries on the standard stock list to determine if the percentages deviate beyond a predetermined limit; and third updating means for updating the stock holdings subset, when the percentages deviate beyond the preset limit, until the percentages do not deviate beyond the preset limit.

9. The system of claim 8, further including:

cash position means responsive to the first data for determining the average cash position of the investment managers of the second investment manager subset; and output means for outputting the stock and cash portfolio report from the computer based on the stock holdings subset and the average cash position of the investment managers of the second investment manager subset.

10. The system of claim 9, wherein:

the standard stock list is the Standard and Poors 500 stock list.

11. A data processing system for producing with a computer a stock and cash portfolio report based upon the performance of major United States institutional investment managers and their stock and cash holdings including:

first data means for entering and storing in the computer an investment manager database containing first data on the investment managers;

first manager subset means responsive to the first data for selectively generating a first investment manager subset of investment managers from the investment manager database based on predetermined criteria;

second manager subset means responsive to the first data for selectively generating a second investment manager subset of investment managers from the first investment manager subset based on performance according to each investment managers' rate of return;

second data means for entering and storing in the computer a government reports database containing second data from reports filed with the government by each of the investment managers of the investment manager database;

list means responsive to the second data for selectively generating a list of stock holdings for each of the investment managers of the second investment manager subset, the contents of the stock holdings lists arranged top to bottom in descending order of market value;

stock holdings subset means responsive to the second data for selectively generating a stock holdings subset of stock holdings based on selecting a predetermined number of investment managers' stocks taken sequentially from the top of the stock holdings list of the second investment manager subset;

third data means for entering and storing in the computer a stock database containing third data relating to a plurality of financial characteristics for a plurality of traded stocks;

beta means responsive to the third data for determining whether the average beta value of the stock holdings subset is greater than 1.0;

first updating means for updating the stock holdings subset, when the average beta value of the stock holdings subset is greater than 1.0, until the average beta value of the stock holdings subset is not greater than 1.0;

standard capitalization means responsive to the third data for determining the average capitalization of a standard stock list of the stock database;

subset capitalization means responsive to the third data for determining the average capitalization of the stock holdings subset and for comparing the average capitalization of the stock holdings subset with the average capitalization of a standard stock list;

second updating means for updating the stock holdings subset, when the average capitalization of the stock holdings subset is less than the average capitalization of the standard stock list, until the average capitalization of the stock holdings subset is not less than the average capitalization of the standard stock list;

standard industry means responsive to the third data for sorting the stock database according to industry and for determining the percentage representation of industries on the standard stock list;

subset industry means responsive to the third data for sorting the stock holdings subset according to industry and for comparing the percentage representation of industries in the stock holdings subset with the percentage representation of industries on the standard stock list to determine if the percentages deviate beyond a predetermined limit; and third updating means for updating the stock holdings subset, when the percentages deviate beyond the preset limit, until the percentages do not deviate beyond the preset limit.

12. The system of claim 11, further including:

cash position means responsive to the first data for determining the average cash position of the investment managers of the second investment manager subset; and output means for outputting the stock and cash portfolio report from the computer based on the stock holdings subset and the average cash position of the investment managers of the second investment manager subset.

13. The system of claim 12, wherein:

the standard stock list is the Standard and Poors 500 stock list.

* * * * *